(12) United States Patent
Mohseni et al.

(10) Patent No.: US 9,030,927 B2
(45) Date of Patent: *May 12, 2015

(54) METHODS AND DEVICES FOR OPTIMIZED CELL ACQUISITIONS

(71) Applicant: QUALCOMM Incorporated, San Diego, CA (US)

(72) Inventors: Jafar Mohseni, San Diego, CA (US); Divaydeep Sikri, Farnborough (GB); Farrukh Rashid, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/463,442

(22) Filed: Aug. 19, 2014

(65) Prior Publication Data

US 2014/0355418 A1    Dec. 4, 2014

Related U.S. Application Data

(63) Continuation of application No. 13/656,360, filed on Oct. 19, 2012, now Pat. No. 8,811,291.

(60) Provisional application No. 61/653,341, filed on May 30, 2012.

(51) Int. Cl.
*H04W 52/02* (2009.01)
*H04W 24/04* (2009.01)
(Continued)

(52) U.S. Cl.
CPC .......... *H04W 52/0238* (2013.01); *H04W 48/16* (2013.01); *H04W 48/20* (2013.01); *H04W 24/04* (2013.01); *H04W 52/0225* (2013.01)

(58) Field of Classification Search
CPC .......................... H04W 52/0238; H04W 24/04
USPC .......................................... 370/221, 328, 342
See application file for complete search history.

(56) References Cited

U.S. PATENT DOCUMENTS 6,463,298 B1 * 10/2002 Sorenson et al. .......... 455/552.1
6,766,169 B2    7/2004 Cooper
(Continued)

FOREIGN PATENT DOCUMENTS

EP    0812119    12/1997
EP    1890508 A1    2/2008
(Continued)

OTHER PUBLICATIONS

International Search Report and Written Opinion—PCT/US2013/042737—ISA/EPO—Aug. 27, 2013.

*Primary Examiner* — Rasheed Gidado
(74) *Attorney, Agent, or Firm* — QUALCOMM IP Department; James Hunt Yancey, Jr.

(57) ABSTRACT

Access terminals are adapted to blacklist one or more neighboring cells from acquisition attempts. For instance, an access terminal may receive a transmission including a list of neighboring cells to be monitored while connected to a particular serving cell. The access terminal may determine that a predefined number of consecutive acquisition attempts with a particular neighboring cell have failed. In response to failure of the predefined number of consecutive acquisition attempts, the access terminal can blacklist the neighboring cell from subsequent acquisition attempts for a predefined blacklisting period. Following the duration of the blacklisting period, the access terminal may conduct a subsequent acquisition attempt with the neighboring cell. Other aspects, embodiments, and features are also claimed and described.

22 Claims, 6 Drawing Sheets

(51) Int. Cl.
*H04W 48/16* (2009.01)
*H04W 48/20* (2009.01)

(56) References Cited

U.S. PATENT DOCUMENTS

| | | |
|---|---|---|
| 7,295,857 B2 | 11/2007 | Joshi et al. |
| 7,463,887 B2 | 12/2008 | Roberts et al. |
| 7,499,703 B2 | 3/2009 | Zhang et al. |
| 7,907,947 B2 | 3/2011 | Ida et al. |
| 7,962,135 B2 * | 6/2011 | Cooper .................... 455/432.1 |
| 8,695,063 B2 * | 4/2014 | Kholaif et al. ................ 726/3 |
| 8,811,291 B2 | 8/2014 | Mohseni et al. |
| 2009/0082020 A1 * | 3/2009 | Ch'ng et al. ............. 455/435.3 |
| 2009/0098872 A1 * | 4/2009 | Deshpande et al. ...... 455/435.2 |
| 2009/0245176 A1 * | 10/2009 | Balasubramanian et al. 370/328 |
| 2010/0046385 A1 * | 2/2010 | Kamei et al. ................ 370/252 |
| 2011/0110282 A1 | 5/2011 | Wu et al. |

FOREIGN PATENT DOCUMENTS

| | | |
|---|---|---|
| WO | WO-2009120898 A2 | 10/2009 |
| WO | WO-2012064502 A1 | 5/2012 |

* cited by examiner

METHODS AND DEVICES FOR OPTIMIZED CELL ACQUISITIONS

CROSS REFERENCE TO RELATED APPLICATION & PRIORITY CLAIM

The present Application for Letters Patent is a continuation of, and claims priority to U.S. patent application Ser. No. 13/656,360 entitled "METHODS AND DEVICES FOR OPTIMIZED CELL ACQUISITIONS" filed Oct. 19, 2012 and claiming priority to U.S. Provisional Application No. 61/653,341 entitled "METHODS AND DEVICES FOR OPTIMIZING CELL ACQUISITIONS" filed May 30, 2012. Both applications are assigned to the assignee hereof and hereby expressly incorporated by reference herein as if fully set forth below and for all applicable purposes.

TECHNICAL FIELD

Embodiments of the present invention relate generally to wireless communication, and more specifically to methods and devices for facilitating optimized acquisitions of a cell and other communication components.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

Access terminals adapted to access one or more wireless communications systems are becoming increasingly popular, with consumers often using power-intensive applications that run on the access terminals. Access terminals are typically battery-powered and the amount of power a battery can provide between charges is generally limited. There remains a need for access terminal configured for and enabled to consume power resources in an efficient manner.

BRIEF SUMMARY OF SOME EXAMPLES

Embodiments of the present invention are provisioned for addressing the above discussed issues as well as others. Indeed, embodiments of the present invention provide wireless communication devises configured for efficient power consumption during operation. The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some instances, features which may assist in extending the operating life of access terminals between recharging the battery can be beneficial. Various features and aspects of the present disclosure are adapted to facilitate power conservation by optimizing cell acquisition procedures with one or more neighboring cells. According to at least one aspect of the present disclosure, access terminals may include a communications interface operatively coupled with a processing circuit such that the processing circuit is configured to manage wireless communications via the communications interface. The processing circuit may determine that a predefined number of consecutive acquisition attempts with a base station have failed. In response to failure of the predefined number of consecutive acquisition attempts, and when at least one of a number of other available base stations is greater than or equal to a predetermined threshold or a number of other base stations currently blacklisted is below a predetermined threshold, the processing circuit may ignore the base station for subsequent acquisition attempts for a predefined blacklisting period of time. Following the expiration of the blacklisting period, the processing circuit may conduct a subsequent acquisition attempt with the base station.

Further aspects provide methods operational on an access terminals and/or access terminals including means to perform such methods. One or more examples of such methods may include conducting a plurality of consecutive acquisition attempts with a base station. A determination may be made that a predefined number of consecutive acquisition attempts with the base station have failed. In response to failure of the predefined number of consecutive acquisition attempts, and when at least one of a number of other available base stations is greater than or equal to a predetermined threshold or a number of other base stations currently blacklisted is below a predetermined threshold, subsequent acquisition attempts with the base station may be ceased for a predefined blacklisting period. A subsequent acquisition attempt with the base station may be conducted following the predefined blacklisting period.

Still further aspects include computer-readable storage mediums storing processor-executable programming operational on an access terminal. According to one or more examples, such programming may be adapted for determining that a predefined number of consecutive acquisition attempts with a base station have failed. The programming may further be adapted to blacklist the base station from subsequent acquisition attempts for a predefined blacklisting period in response to failure of the predefined number of consecutive acquisition attempts, and further in response to an availability of a predefined number of other base stations for acquisition by the access terminal, a number of other blacklisted base stations being below a predefined threshold, or both the availability of the predefined number of other base stations for acquisition by the access terminal and the number of other blacklisted base stations being below a predefined threshold. The programming can further be adapted to conduct a subsequent acquisition attempt with the base station following the duration of the blacklisting period.

Other aspects, embodiments, and features within the scope of the present disclosure will become apparent to those of ordinary skill in the art upon reviewing the following detailed description. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the discussions are described below for 3rd Generation Partnership Project (3GPP) protocols and systems, and related terminology may be found in much of the following description. However, those of ordinary skill in the art will recognize that one or more aspects of the present disclosure may be employed and included in one or more other wireless communication protocols and systems.

Figure 1:
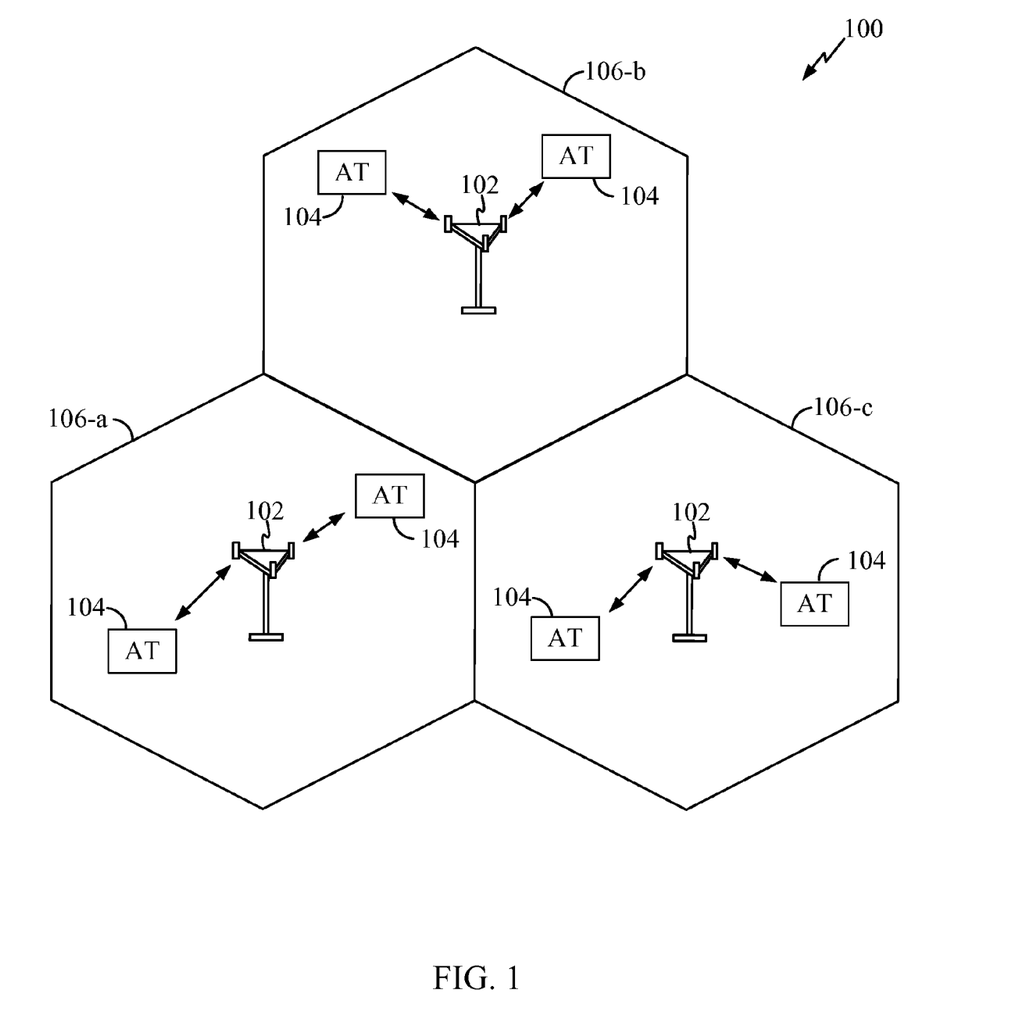
FIG. 1 is a block diagram illustrating an example of a network environment in which one or more aspects of the present disclosure may find application.

FIG. 1 is a block diagram of a network environment in which one or more aspects of the present disclosure may find application. The wireless communications system 100 includes base stations 102 adapted to communicate wirelessly with one or more access terminals 104. The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. The base stations 102 are configured to communicate with the access terminals 104 under the control of a base station controller (see FIG. 2) via multiple carriers. Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). The system 100 may include base stations 102 of different types (e.g., macro, micro, femto and/or pico base stations).

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a smartphone, a television, an appliance, an e-reader, a digital video recorder (DVR), a machine-to-machine (M2M) device, an entertainment device, and/or other communication/computing device which communicates, at least partially, through a wireless or cellular network.

Figure 2:
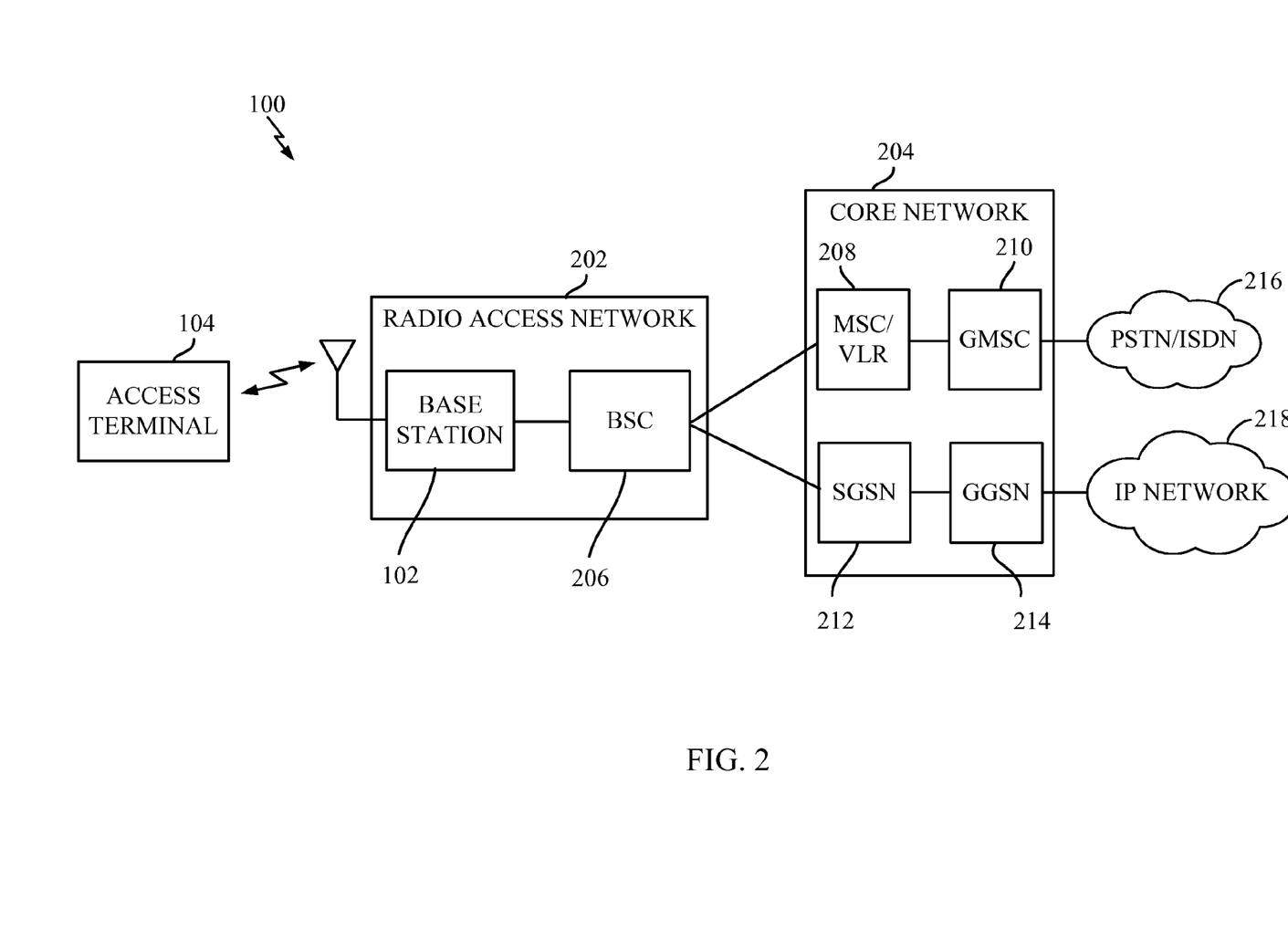
FIG. 2 is a block diagram illustrating select components of the wireless communication system of FIG. 1 according to at least one example.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as a EIR, HLR, VLR and AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
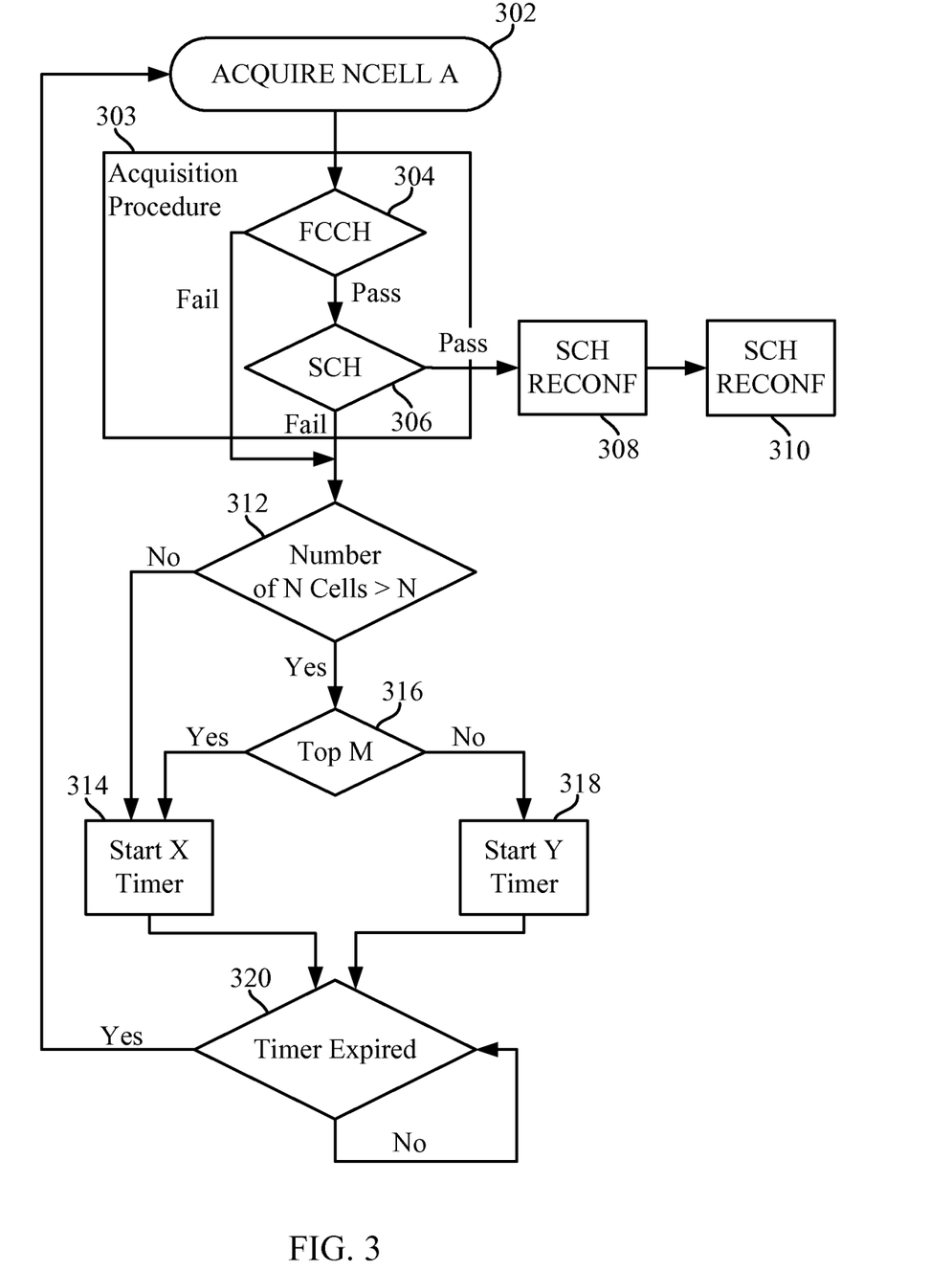
FIG. 3 is a flow diagram illustrating at least one example of a method for monitoring one or more neighboring cells according to some embodiments of the present invention.

As an access terminal 104 operates within the wireless communications system 100, the access terminal 104 may be connected with a serving cell, and may monitor one or more neighboring cells. In some examples, the access terminal 104 may monitor a predefined maximum number of neighboring cells and may further rank the neighboring cells being monitored. As part of the process for monitoring the one or more neighboring cells, the access terminal 104 typically ensures that it is synchronized with each neighboring cell. Turning to FIG. 3, a flow diagram is shown illustrating an example of a method for monitoring the one or more neighboring cells (Ncells). As shown, the access terminal 104 may initially acquire a neighboring cell, such as neighboring cell A at 302. Acquisition may be accomplished by an acquisition procedure 303 commonly referred to by those of skill in the art as a "combined acquisition procedure." During a combined acquisition procedure 303, the access terminal 104 may employ the control channel carrier associated with each cell to initially detect the Frequency Correction Channel (FCCH) for frequency synchronization, followed by the Synchronization Channel (SCH) for time synchronization.

At 304, the access terminal 104 determines whether it has successfully completed frequency synchronization from the Frequency Correction Channel (FCCH). The Frequency Correction Channel (FCCH) is a downlink-only control channel in the GSM air interface. The Frequency Correction Channel (FCCH) may include a burst with a pre-defined sequence (e.g., an all-zero sequence) that produces a fixed tone in the Gaussian minimum-shift keying (GMSK) modulator output. This tone enables the access terminal 104 to lock its local oscillator to the clock of the base station 102 for frequency synchronization.

If the frequency synchronization was successful, the access terminal 104 can synchronize to the neighboring cell's timing structures from the Synchronization Channel (SCH). At 306, the access terminal 104 determines whether it has successfully decoded the Synchronization Channel (SCH). The Synchronization Channel (SCH) typically follows in the frame immediately after the Frequency Correction Channel (FCCH). The Synchronization Channel (SCH) enables the access terminal 104 to quickly identify a nearby cell and synchronize to that cell's timing structures (e.g., TDMA structures). Each radio burst on the Synchronization Channel (SCH) may include the current frame clock of the particular base station 102 associated with the cell, an identity code (e.g., base station identity code (BSIC)) associated with the base station 102, and an extended training sequence.

If both the frequency synchronization from the Frequency Correction Channel (FCCH) at 304 and the timing synchronization from the Synchronization Channel (SCH) at 306 are successful, the access terminal 104 may perform periodic reconfirmations of the Synchronization Channel (SCH) as shown at 308 and 310. However, if either the frequency synchronization at 304 or the timing synchronization at 306 fails, the access terminal 104 can move to step 312. At 312, the access terminal 104 determines whether it is monitoring more than some predefined number 'N' of neighboring cells. If the access terminal 104 is not monitoring more than 'N' neighboring cells (e.g., it is monitoring 'N' or fewer neighboring cells), then the access terminal 104 may set a delay timer for a predefined first delay period of x seconds at 314.

On the other hand, if the access terminal 104 is currently monitoring more than 'N' neighboring cells, then the access terminal 104 determines whether the particular neighboring cell which the access terminal 104 failed to acquire (e.g., failed frequency or timing synchronizations) is ranked as one of the top 'M' neighboring cells at 316, where 'M' is some predefined number (e.g., top 2, top 3, top 4, etc.). If the neighboring cell is ranked as one of the top 'M' neighboring cells, then the access terminal 104 can set the delay timer for the first delay period of x seconds at 314. If the neighboring cell is not ranked as one of the top 'M' neighboring cells, then the access terminal 104 can set another delay timer for a predefined second delay period of y seconds at 318, where the second delay period of y seconds is greater than the first delay period of x seconds. In some embodiments, the x and y periods can be in a range of seconds or minutes (e.g., 10 seconds or 30 seconds). The x and y periods may also be dynamic and may also be configured to be tied to a certain number of frames.

At 320, the access terminal 104 determines whether the particular delay timer has expired (e.g., either the first delay period of x seconds or the second delay period of y seconds). On expiration of whichever delay timer was set, the access terminal 104 returns to the beginning at step 302 to repeat the process of attempting to acquire the neighboring cell.

Typically, when the access terminal 104 is unable to acquire the neighboring cell, this process can continue to repeat after each first or second delay period of x or y seconds. The delay periods can depend on which delay timer is initiated each consecutive attempt. According to a feature of the present disclosure, when an access terminal 104 is unable to acquire a cell after a predetermined number of consecutive acquisition attempts, the particular cell can be ignored (e.g., blacklisted) for a certain blacklisting period of time (e.g., 2 minutes, a certain number of frames, or other static/dynamic time periods) before attempting a subsequent acquisition. In some embodiments not focusing on certain base stations can also include base stations that are undesired, not favored, cannot provide a certain desired service quality, and/or disregarded in some embodiments. Such features may enable an access terminal 104 to avoid devoting too much time trying to acquire a cell that the access terminal 104 may be unable to acquire (e.g., as a result of interference, low power, or other factors). By reducing continued acquisition attempts, this can result in one or more of unnecessary power drain, reduced performance loss, and improved user experience.

Figure 4:
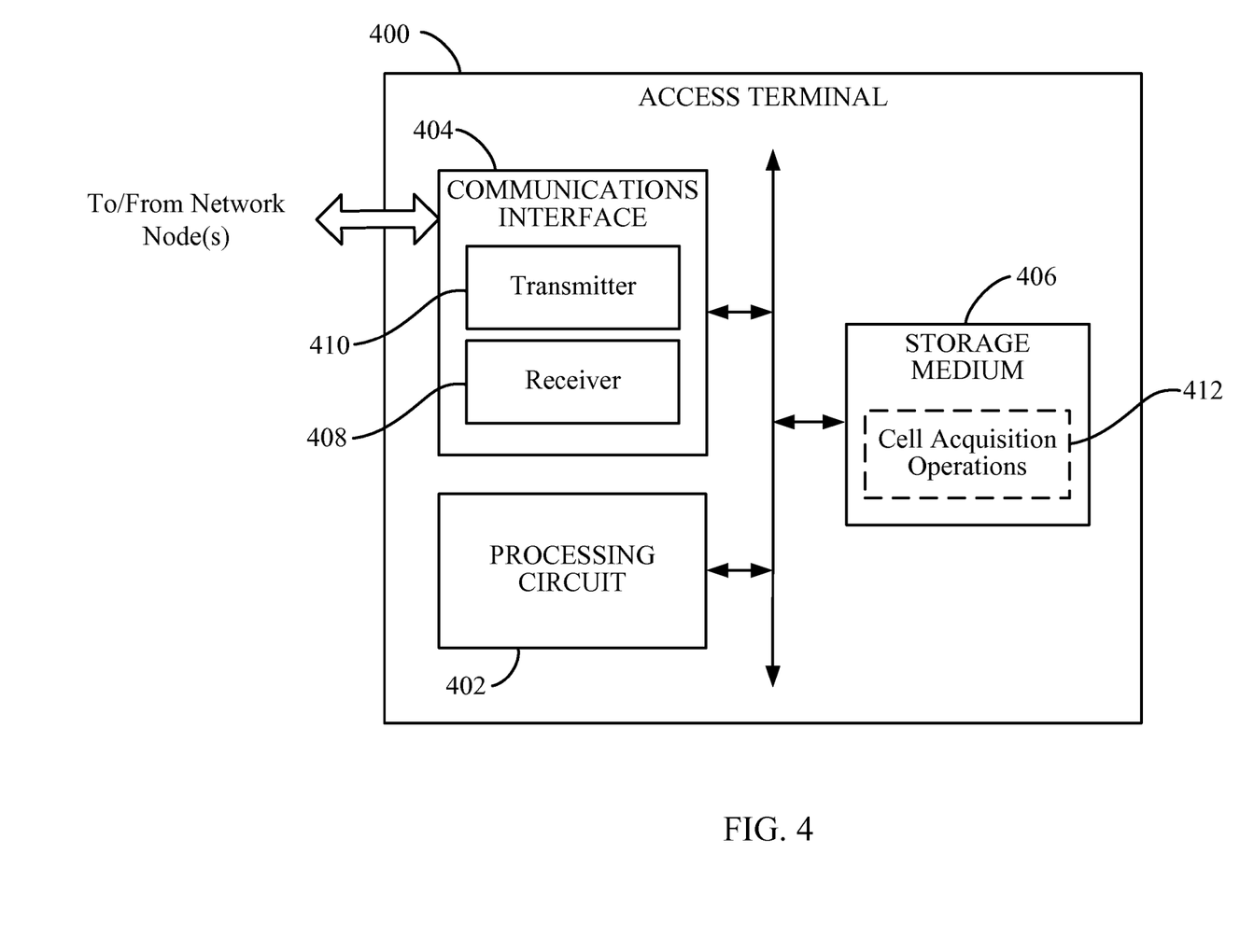
FIG. 4 is a block diagram illustrating select components of an access terminal according to at least one example.

FIG. 4 is a block diagram illustrating select components of an access terminal 400 according to at least one example. As shown, the access terminal 400 may include a processing circuit 402 coupled to or placed in electrical communication with a communications interface 404 and a storage medium 406.

The processing circuit 402 is arranged to obtain, process and/or send data, control data access and storage, issue commands, and control other desired operations. The processing circuit 402 may include circuitry adapted to implement desired programming provided by appropriate media in at least one example. For example, the processing circuit 402 may be implemented as one or more processors, one or more controllers, and/or other structure configured to execute executable programming. Examples of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 402 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 402 are for illustration and other suitable configurations within the scope of the present disclosure are also contemplated.

The processing circuit 402 is adapted for processing, including the execution of programming, which may be stored on the storage medium 406. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 404 is configured to facilitate wireless communications of the access terminal 400. For example, the communications interface 404 may include circuitry and/or programming adapted to facilitate the communication of information bi-directionally with respect to one or more network nodes. The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more computer-readable, machine-readable, and/or processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing and/or carrying programming. By way of example and not limitation, the storage medium 406 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the access terminal 400, external to the access terminal 400, and/or distributed across multiple entities).

Programming stored by the storage medium 406, when executed by the processing circuit 402, causes the processing circuit 402 to perform one or more of the various functions and/or process steps described herein. For example, the storage medium 406 may include cell acquisition operations 414. The cell acquisition operations 414 can be implemented by the processing circuit 402 to perform acquisition of a cell, including employing a blacklisting delay period between acquisition attempts following a predetermined number of consecutive failed acquisition attempts. Thus, according to one or more aspects of the present disclosure, the processing circuit 402 is adapted to perform (in conjunction with the storage medium 406) any or all of the processes, functions, steps and/or routines for any or all of the access terminals described herein (e.g., access terminal 104 and/or 400). As used herein, the term "adapted" in relation to the processing circuit 402 may refer to the processing circuit 402 being one or more of configured, employed, implemented, and/or programmed to perform a particular process, function, step and/or routine according to various features described herein.

Figure 5:
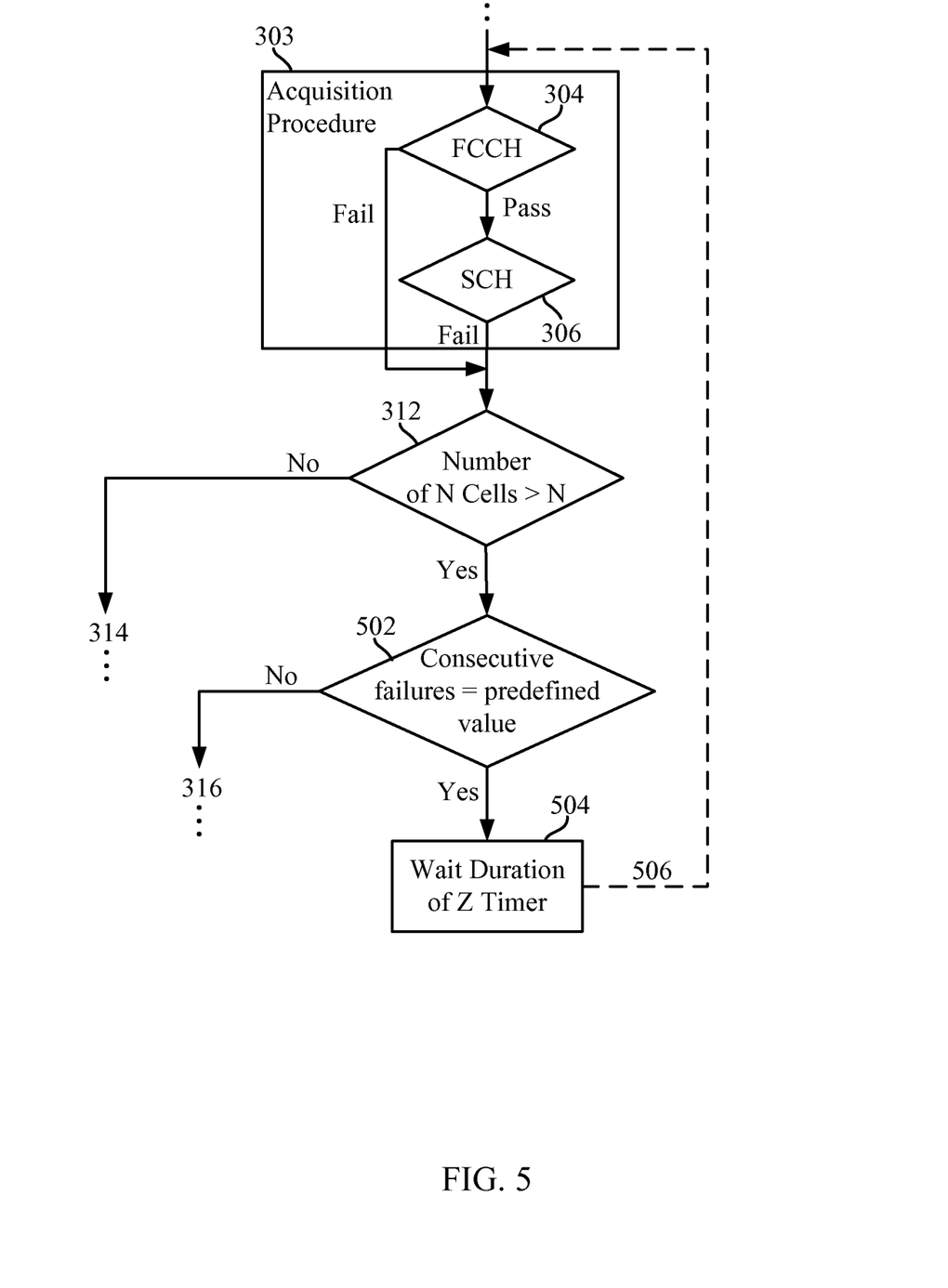
FIG. 5 is a flow diagram illustrating at least one example of a modification to the method of FIG. 3 for monitoring one or more neighboring cells according to some embodiments of the present invention.

In operation, the access terminal 400 can wait a predetermined period of time before attempting to acquire a neighboring cell after a predetermined number of consecutive acquisition attempts have failed. For example, FIG. 5 shows a flow diagram including aspects that may be implemented within the flow diagram of FIG. 3. Such aspects can be implemented after failure of the frequency synchronization at 304 or the timing synchronization at 306 in FIG. 3, and before attempting to acquire the neighboring cell at 302 for a subsequent time. In the example depicted in FIG. 5, the additional steps may occur after determining whether the number of neighboring cells is greater than the predefined number 'N' at 312. For example, when either the frequency synchronization at 304 fails or the timing synchronization at 306 fails, the access terminal can determine at 312 whether it is monitoring more than some predefined number 'N' of neighboring cells. If the access terminal 400 is not monitoring more than 'N' neighboring cells (e.g., it is monitoring 'N' or fewer neighboring cells), then the access terminal 400 may move to step 314 in FIG. 3, where a delay timer is set for a predefined first delay period of x seconds.

On the other hand, when the number of neighboring cells is greater than the predefined number 'N', the access terminal 400 can determine at step 502 whether the acquisition procedure for the neighboring cell has failed a predefined number of times consecutively. For instance, in some examples the predefined number of consecutive failures may be two. Accordingly, if the access terminal 400 has failed to acquire the neighboring cell two consecutive times, the access terminal can determine at step 502 that the number of consecutive failures is equal to the predefined value of two.

If the number of consecutive failures to acquire the neighboring cell is still less than the predefined number, the access terminal 400 can go to step 316 of FIG. 3 and continue onward from 316, as described above with reference to FIG. 3. When the number of consecutive failures to acquire the neighboring cell is equal to the predefined number, the access terminal 400 can blacklist the particular neighboring cell. This means that the access terminal 400 sets a timer for a predefined blacklisting period of z seconds (e.g., the z timer) and waits for at least the duration of this blacklisting period at 504 before another attempt at acquiring the neighboring cell is performed. In some examples, the blacklisting period is substantially larger than the first and second delay periods. That is, the blacklisting period of z seconds is substantially larger than the first delay period of x seconds and the second delay period of y seconds (e.g., z>>x and z>>y) for the for the first and second delay periods described above. In some instances, the access terminal 400 may employ one of the first or second delay periods described above after the duration of the blacklisting period. In such examples, the access terminal 400 can move to the step 314 of FIG. 3 after the blacklisting period, and continue onward as described above. In other examples, the access terminal 400 may attempt another acquisition procedure 303 after the duration of the z timer (e.g., the blacklisting period) at 504, as indicated by the broken arrow 506.

Figure 6:
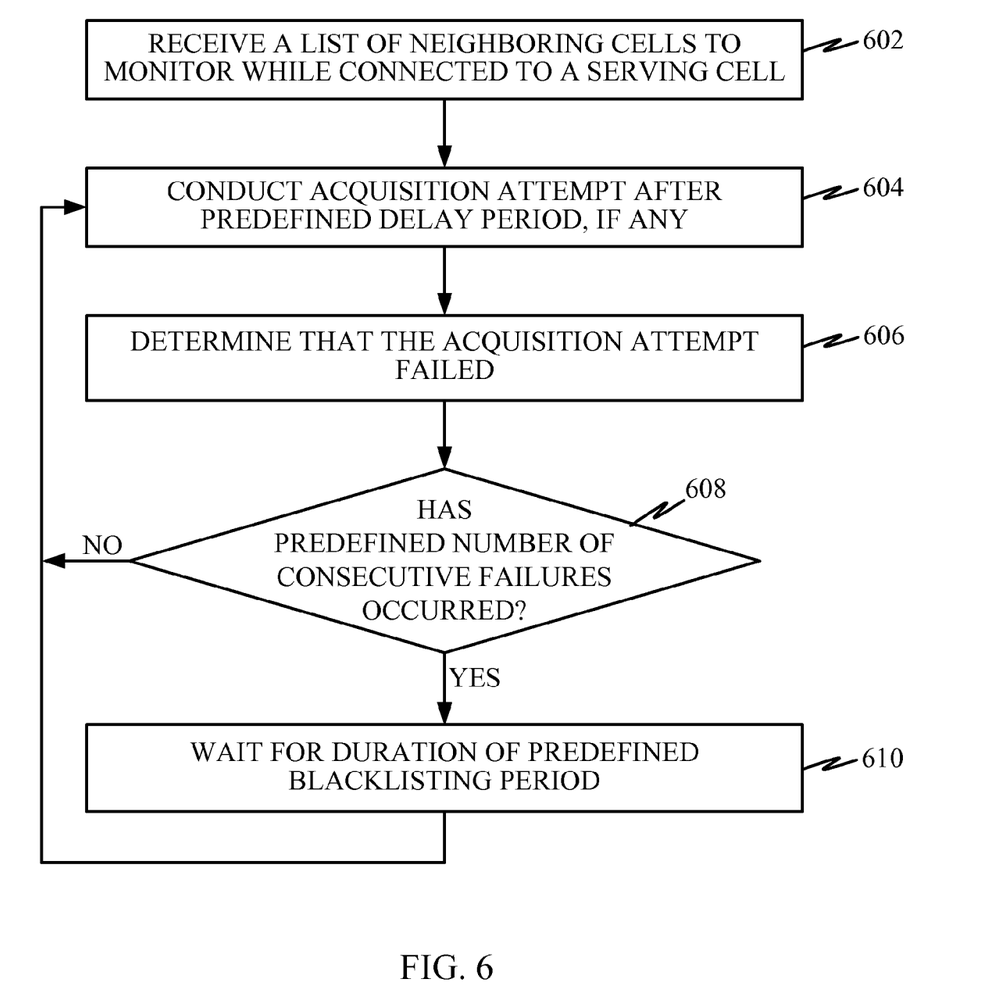
FIG. 6 is a flow diagram illustrating a method operational on an access terminal according to at least one example.

Additional aspects of the present disclosure include methods of operation for an access terminal FIG. 6 is a flow diagram illustrating an example of a method operational on an access terminal, such as the access terminal 400, according to at least one implementation. Referring to FIGS. 4 and 6, an access terminal 400 may initially receive a transmission from the network including a list of neighboring cells (or base stations) to be monitored by the access terminal 400 at step 602. For example, each time the access terminal 400 connects to a serving cell, the processing circuit 402 may receive a transmission via the communications interface 404 including a list of neighboring cells which the access terminal 400 is to monitor. To facilitate such monitoring, the access terminal 400 may maintain synchronization with at least some of the neighboring cells from the received list.

At step 604, the access terminal can conduct an acquisition attempt with a neighboring cell included in the received list. The acquisition attempt can facilitate synchronization with the neighboring cell. The initial acquisition attempt of a neighboring cell can be conducted without any delay. Such an acquisition attempt may be conducted by the processing circuit 402 executing the cell acquisition operations 412 to perform a combined acquisition procedure. As noted above, a combined acquisition procedure may include the processing circuit 402 detecting via the communications interface 404 a Frequency Correction Channel (FCCH) for frequency synchronization, followed by a Synchronization Channel (SCH) for time synchronization.

At step 606, the access terminal 400 may determine that the acquisition attempt failed. For example, the processing circuit 402 executing the cell acquisition operations 412 may determine that the acquisition attempt failed. In at least one example, the processing circuit 402 executing the cell acquisition operations 412 may determine that either the frequency synchronization or the timing synchronization of a combined acquisition procedure has failed. Other factors may also be utilized to determine that acquisition has failed. For example, transmission power, service quality, and network load may also be considered in alternative embodiments.

At step 608, the access terminal 400 can determine whether a predefined number of consecutive failures have occurred. For example, the processing circuit 402 executing the cell acquisition operations 412 may keep a count of the number of consecutive access attempts that have been made for each cell. When the count number is below a predetermined value, the processing circuit 402 executing the cell acquisition operations 412 can determine that the predetermined number of consecutive failures have not occurred. On the other hand, when the count number is equal to the predetermined value, the processing circuit 402 executing the cell acquisition operations 412 can determine that the predetermined number of consecutive failures have occurred.

When the access terminal 400 determines that the predetermined number of consecutive failures have not occurred, the access terminal 400 can return to step 604, in which a subsequent access attempt is conducted after waiting for a duration of a predefined delay period. For instance, the processing circuit 402 can determine that the predetermined number of consecutive failures have not occurred. As a result, the processing circuit 402 executing the cell acquisition operations 412 initiate a subsequent access attempt at step 604 after the processing circuit 402 has waited for the duration of a predefined delay period. The delay period may vary according to the cell ranking and/or the total number of cells being monitored. For instance, the processing circuit 402 executing the cell acquisition operations 412 may wait a first delay period of x seconds when a number of monitored neighboring cells is less than or equal to a predetermined threshold, or when the neighboring cell is ranked in a predefined number of top neighboring cells (see, e.g., steps 312, 314, 316, and 320 in FIG. 3 and the associated description above). The processing circuit 402 executing the cell acquisition operations 412 may wait a longer second delay period of y seconds when the number of monitored neighboring cells is greater than the predetermined threshold, and the neighboring cell is not ranked in the predefined number of top neighboring cells (see, e.g., steps 312, 316, 318 and 320 in FIG. 3 and the associated description above).

When the access terminal 400 determines that the predetermined number of consecutive failures have occurred at step 608, the access terminal 400 can wait for the duration of a predefined blacklisting period (e.g., time z) at step 610 before attempting to reacquire the cell (e.g., the blacklisted cell). That is, the access terminal 400 can cease from subsequent acquisition attempts with the neighbor cell for a predefined blacklisting period. For example, in response to the failure of the predefined number of consecutive acquisition attempts, the processing circuit 402 executing the cell acquisition operations 412 can blacklist the neighboring cell for the duration of the predefined blacklisting period of z seconds. After the blacklisting period has expired, the processing circuit 402 executing the cell acquisition operations 412 can conduct a subsequent acquisition attempt. The amount of time for the blacklisting period (e.g., time z) can be selected to be substantially larger than amount of times associated with the first and second delay periods (e.g., z>>x and z>>y).

In at least some instances, the blacklisting period (e.g., time z) can be varied depending on the number of neighbor cells being monitored and/or the number of consecutive times a neighboring cell has been blacklisted. The processing circuit 402 executing the cell acquisition operations 412 may avoid blacklisting a cell if the number of cells being monitored are less than 'N'. In such cases, the processing circuit executing the cell acquisition operations 412 may employ the first or second delay period instead of the blacklisting period. Avoiding blacklisting of a cell in such cases can reduce the possibility of the access terminal 400 going out of service as a result of all the neighbor cells being blacklisted. In some examples, the processing circuit 402 executing the cell acquisition operations 412 may skip the predefined waiting period of step 610 if the total number of all neighboring cells is below some threshold (e.g. there are fewer than 'N' neighbor cells). By way of example and not limitation, some implementations may employ a threshold of six (6) neighboring cells. In such examples, when there are fewer than six (6) neighboring cells in the received list, the processing circuit 402 executing the cell acquisition operations 412 can skip step 610 and go directly to step 604.

One or more of the various features and aspects of the present disclosure can enable access terminals to, other things, avoid devoting an excessive amount of time attempting to acquire a neighboring cell that the access terminal may be at least temporarily unable to acquire. By reducing the number of acquisition attempts by the access terminal, significant power savings, improvements in performance and other advantages can be achieved.

While the above discussed aspects, arrangements, and embodiments are discussed with specific details and particularity, one or more of the components, steps, features and/or functions illustrated in FIGS. 1, 2, 3, 4, 5 and/or 6 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 2 and/or 4 may be configured to perform or employ one or more of the methods, features, parameters, or steps described in FIGS. 3, 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. A device capable of communicating wirelessly with another device, the device comprising:
   a communications interface operatively coupled to a processing circuit such that processing circuit is configured to manage wireless communications via the communications interface;
   the processing circuit being further configured to:
      determine that a predefined number of consecutive acquisition attempts with at least one base station have failed;
      ignore the at least one base station for subsequent acquisition attempts for a predefined blacklisting period in response to the failed consecutive acquisition attempts when at least one of a number of other available base stations is greater than or equal to a predetermined threshold, or a number of other base stations currently blacklisted is below a predetermined threshold; and
      conduct a subsequent acquisition attempt with the at least one base station following the duration of the blacklisting period.

2. The device of claim 1, wherein the processing circuit is configured to receive a transmission via the communications interface including a list of base stations to be monitored.

3. The device of claim 1, wherein the processing circuit is configured to:
   perform the predefined number of consecutive acquisition attempts with the base station with a delay period that is shorter than the blacklisting period between each of the consecutive acquisition attempts.

4. The device of claim 3, wherein the delay period is selected from at least two delay periods, including a first delay period and a second delay period that is longer than the first delay period, the processing circuit being further configured to:
   select the first delay period when a total number of monitored base stations is less than or equal to a predetermined threshold, or when the base station is ranked in a predefined number of top base stations; and
   select the second delay period when the total number of monitored base stations is greater than the predetermined threshold, and the base station is not ranked in the predefined number of top base stations.

5. The device of claim 1, wherein the processing circuit is further configured to:
   conduct the subsequent acquisition attempt with the base station following the duration of the blacklisting period, and after a delay period based on a ranking of the base station.

6. The device of claim 1, wherein the predefined number of consecutive acquisition attempts and the subsequent acquisition attempt each comprises a combined acquisition procedure.

7. A method operational on an access terminal, comprising:
   conducting a plurality of consecutive acquisition attempts with a base station;
   determining that a predefined number of consecutive acquisition attempts with the base station have failed;
   ceasing from subsequent acquisition attempts with the base station for a predefined blacklisting period in response to failure of the predefined number of consecutive acquisition attempts when at least one of a number of other available base stations is greater than or equal to a predetermined threshold, or a number of other base stations currently blacklisted is below a predetermined threshold; and conducting a subsequent acquisition attempt with the base station following the predefined blacklisting period.

8. The method of claim 7, further comprising:
receiving a transmission including a list of base stations to be monitored, wherein the base station is included in the received list.

9. The method of claim 7, wherein conducting the plurality of consecutive acquisition attempts with the base station comprises:
waiting for a duration of a delay period between each consecutive acquisition attempt, wherein the delay period is shorter than the blacklisting period.

10. The method of claim 9, wherein waiting for the duration of the delay period between each consecutive acquisition attempt comprises:
waiting for a first delay period when a number of monitored base stations is less than or equal to a predetermined threshold, or when the base station is ranked in a predefined number of top base stations; and
waiting for a second delay period that is greater than the first delay period when the number of monitored base stations is greater than the predetermined threshold, and the base station is not ranked in the predefined number of top base stations.

11. The method of claim 7, wherein conducting the subsequent acquisition attempt with the base station following the predefined blacklisting period further comprises:
conducting the subsequent acquisition attempt with the base station following the predefined blacklisting period and further following a delay period comprising a duration based on a ranking of the base station.

12. An access terminal, comprising:
means for determining that a predefined number of consecutive acquisition attempts with a base station have failed;
means for ceasing from subsequent acquisition attempts with the base station for a predefined blacklisting period in response to failure of the predefined number of consecutive acquisition attempts, and further in response to
an availability of a predefined number of other base stations for acquisition by the access terminal,
a number of other blacklisted base stations being below a predefined threshold, or
both the availability of the predefined number of other base stations for acquisition by the access terminal and the number of other blacklisted base stations being below a predefined threshold; and
means for conducting a subsequent acquisition attempt with the base station following the predefined blacklisting period.

13. The access terminal of claim 12, further comprising:
means for performing the predefined number of consecutive acquisition attempts with the base station; and
means for waiting for a duration of a delay period between each of the predefined number of consecutive acquisition attempts, wherein the delay period is shorter than the blacklisting period.

14. The access terminal of claim 13, wherein the delay period is selected from at least two delay periods, including a first delay period and a second delay period that is longer than the first delay period, and further comprising:
means for selecting the first delay period when a total number of monitored base stations is less than or equal to a predetermined threshold, or when the base station is ranked in a predefined number of top base stations; and
means for selecting the second delay period when the total number of monitored base stations is greater than the predetermined threshold, and the base station is not ranked in the predefined number of top base stations.

15. The access terminal of claim 12, wherein an acquisition attempt comprises a combined acquisition procedure.

16. The access terminal of claim 12, wherein the means for conducting the subsequent acquisition attempt with the base station following the predefined blacklisting period further comprises:
means for conducting the subsequent acquisition attempt with the base station following the predefined blacklisting period and further after a delay period comprising a duration based on a ranking of the base station.

17. A non-transitory computer-readable storage medium storing processor-executable programming for causing a processing circuit to:
determine that a predefined number of consecutive acquisition attempts with a base station have failed;
blacklist the base station from subsequent acquisition attempts for a predefined blacklisting period in response to failure of the predefined number of consecutive acquisition attempts, and further in response to
an availability of a predefined number of other base stations for acquisition by the access terminal,
a number of other blacklisted base stations being below a predefined threshold, or
both the availability of the predefined number of other base stations for acquisition by the access terminal and the number of other blacklisted base stations being below a predefined threshold; and
conducting a subsequent acquisition attempt with the base station following the duration of the blacklisting period.

18. The computer-readable medium of claim 17, further comprising programming for:
receiving a transmission including a list of base stations to be monitored, wherein the base station is included in the received list.

19. The computer-readable medium of claim 17, further comprising programming for:
conducting the predefined number of consecutive acquisition attempts with the base station; and
waiting for a duration of a delay period between conducting each of the predefined number of consecutive acquisition attempts, wherein the delay period is shorter than the blacklisting period.

20. The computer-readable medium of claim 19, wherein waiting for the duration of the delay period between each of the predefined number of consecutive acquisition attempts comprises:
waiting for a first delay period when a number of monitored base stations is less than or equal to a predetermined threshold, or when the base station is ranked in a predefined number of top base stations; and
waiting for a second delay period that is greater than the first delay period when the number of monitored base stations is greater than the predetermined threshold, and the base station is not ranked in the predefined number of top base stations.

21. The computer-readable medium of claim 17, further comprising programming for:
blacklisting the base station from subsequent acquisition attempts for a predefined blacklisting period in response to failure of the predefined number of consecutive acquisition attempts, and further in response to an availability of a predefined number of other base stations for acquisition.

22. The computer-readable medium of claim 17, further comprising programming for:

blacklisting the base station from subsequent acquisition attempts for a predefined blacklisting period in response to failure of the predefined number of consecutive acquisition attempts, and further in response to a number of other blacklisted base stations being below a predefined threshold.

* * * * *